US006470315B1

(12) United States Patent
Netsch et al.

(10) Patent No.: US 6,470,315 B1
(45) Date of Patent: Oct. 22, 2002

(54) ENROLLMENT AND MODELING METHOD AND APPARATUS FOR ROBUST SPEAKER DEPENDENT SPEECH MODELS

(75) Inventors: Lorin Paul Netsch, Allen, TX (US); Barbara Janet Wheatley, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1011 days.

(21) Appl. No.: 08/710,001

(22) Filed: Sep. 11, 1996

(51) Int. Cl.[7] .......................... G10L 15/14; G10L 15/18
(52) U.S. Cl. ....................................... 704/256; 704/257
(58) Field of Search ................................ 704/236, 258, 704/255, 256, 246, 250, 251, 257

(56) References Cited

U.S. PATENT DOCUMENTS 5,440,662 A * 8/1995 Sukkar ....................... 704/236
5,598,507 A * 1/1997 Kimber et al. .............. 704/246
5,606,643 A * 2/1997 Balasubramanian et al. ..... 704/244

OTHER PUBLICATIONS

Wilpon, Jay G., "Automatic Recognition of Keywords in Unconstrained Speech Using Hidden Markov Models," IEEE Transactions on Acoustics, Speech, and Signal Processing, vol. 38, No. 11, Nov. 1990, pp. 1870–1877.

* cited by examiner

*Primary Examiner*—Richemond Dorvil
(74) *Attorney, Agent, or Firm*—Robert L. Troike; Frederick J. Telecky, Jr.

(57) ABSTRACT

Speech recognition and the generation of speech recognition models is provided including the generation of unique phonotactic garbage models (15) to identify speech by, for example, English language constraints in addition to noise, silence and other non-speech models (11) and for speech recognition specific word models.

25 Claims, 4 Drawing Sheets

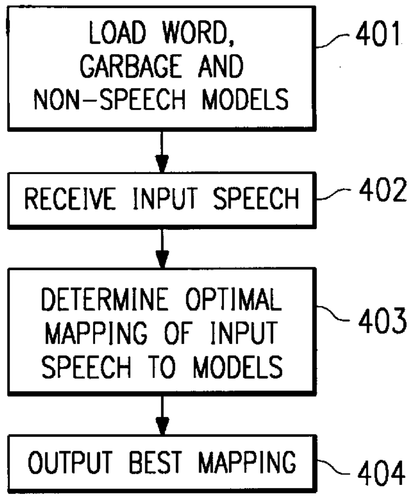
FIG. 4
FIG. 6
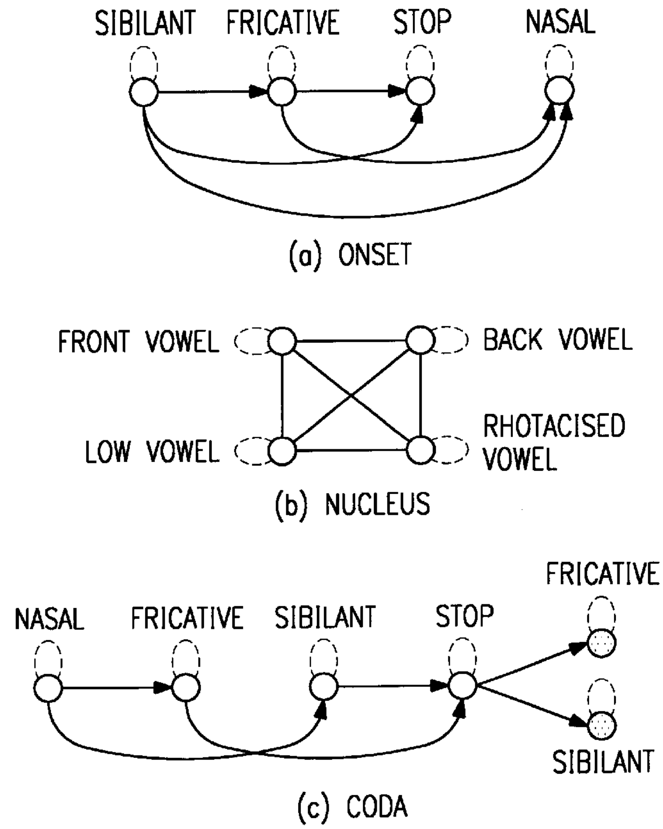
FIG. 5
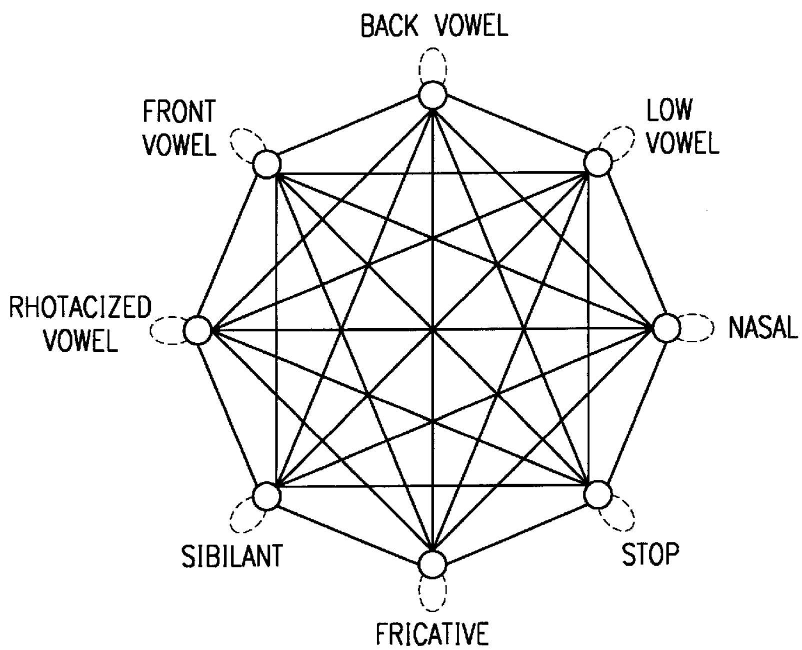

ENROLLMENT AND MODELING METHOD AND APPARATUS FOR ROBUST SPEAKER DEPENDENT SPEECH MODELS

TECHNICAL FIELD OF THE INVENTION

This invention relates to speech recognition and verification and more particularly to speech models for automatic speech recognition and speaker verification.

BACKGROUND OF THE INVENTION

Texas Instruments Incorporated is presently fielding telecommunications systems for Spoken Speed Dialing (SSD) and Speaker Verification in which a user may place calls or be verified by using voice inputs only. These types of tasks require the speech processing system to elicit phrases from the user, and create models of the unique phrases provided during a procedure termed enrollment. The enrollment task requires the user to say each phrase several times. The system must create speech models from this limited speech data. The accuracy with which the system creates the speech models ultimately determines the level of performance of the application. Hence, procedures which improve speech models will provide performance improvement.

There are two distinct problems associated with creating such speech models in realistic environments. The first problem is locating speech within utterances of the phrases. In a noisy environment speech may be missed. Typically, Texas Instruments Incorporated and others have examined the energy profile and other features of the speech signal to locate speech segments. In a noisy environment this is a difficult task. Often the energy-based location algorithms miss speech segments because the algorithms are tuned to ensure noise is not mistaken as speech.

The second problem is variability in the way a user says a name during enrollment. If the name contains multiple words, such as a “John Doe”, the user may or may not pause between the words. If the user says the words without pause, a practical locating and model-building algorithm can not determine that multiple words were spoken. The algorithm will proceed to create a model for a single word with no pause. Then, when the system attempts to recognize the name spoken with an intermediate pause, the system will often fail. A less severe mismatch takes place when the opposite occurs. If the user pauses between words during enrollment, then the enrollment algorithm can spot the pause. However, if the user does not insert the pause during recognition, often the words are spoken in a shorter manner and coarticulation acoustic effects are present between the two words.

The present invention describes methods and apparatus developed to mitigate both of the problems.

SUMMARY OF THE INVENTION

In accordance with one preferred embodiment of the present invention a unique garbage model restricted to meet the phonotactic constraints of a language or group of languages is provided for locating speech in the presence of other sounds including spurious inhalation, exhalation, noise sounds, and background silence. In accordance with another embodiment of the present invention, a unique method of constructing models of the located speech segments in an utterance is provided. In accordance with another embodiment of the present invention, a speech recognition system is provided to locate speech in an utterance using the unique garbage model. in accordance with a still further embodiment of the present invention, a speech enrollment method is provided using a speech recognition system that utilizes the unique garbage model.

These and other features of the invention will be apparent to those skilled in the art from the following detailed description of the invention, taken together with the accompanying drawings.

DESCRIPTION OF THE DRAWINGS

In the drawing:

FIG. 4 is a flow chart for the steps for the operation of a recognizer;

FIG. 5 illustrates “garbage” model HMM structure;

FIG. 6 illustrates garbage model structure for modeling syllables;

DESCRIPTION OF PREFERRED EMBODIMENT OF THE PRESENT INVENTION

Figure 1:
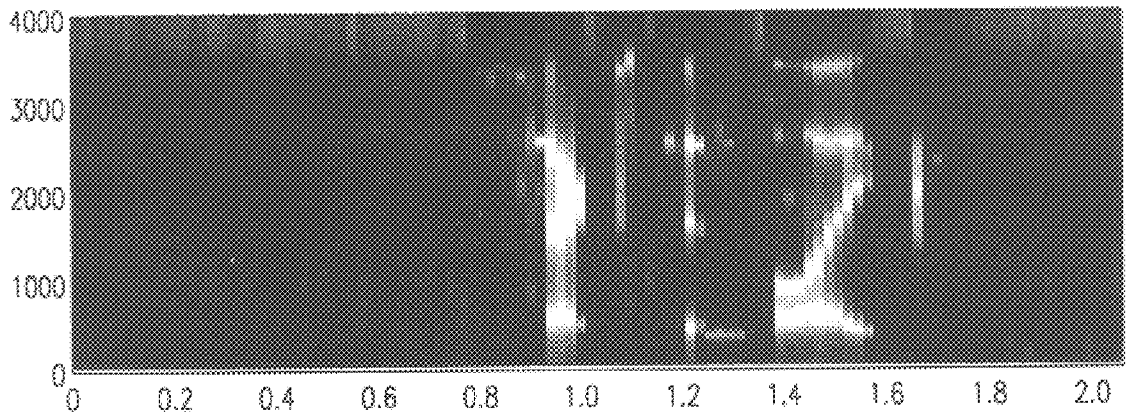
FIG. 1 is a spectrogram of a user saying “Sexton Blake”
Figure 2:
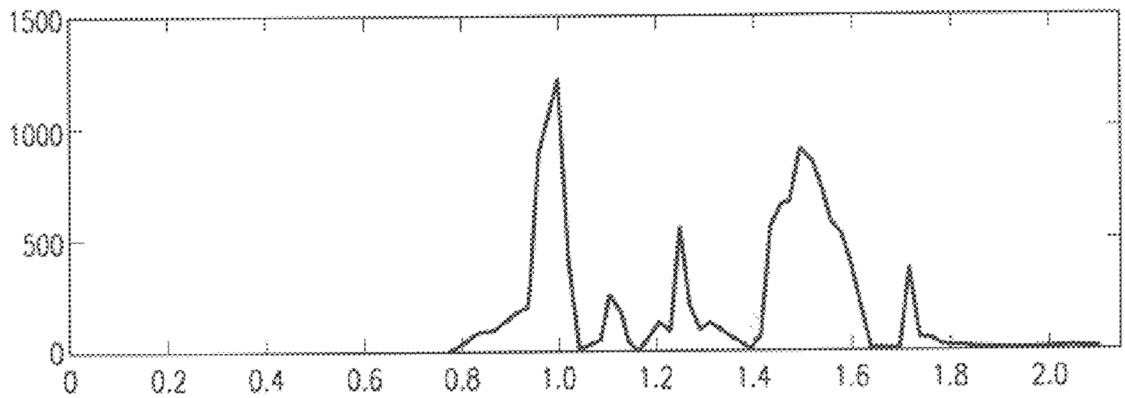
FIG. 2 is an energy profile of FIG. 1.

As mentioned in the background of the invention, present art systems usually use the energy profile of the speech signal, along with other features derived directly from the speech signal, to predict where speech is located in the signal. In a noisy environment the algorithm must be adjusted so that noise is not confused with speech. This often causes portions of speech to be missed. An examination of spectral characteristics of the speech signal over telephone lines intuitively suggests that spectral information can be of value in locating speech segments in a noisy signal. An example is shown in FIG. 1. FIG. 1 is a spectrogram of a user saying the name “Sexton Blake” over the telephone. The vertical axis represents frequency, the horizontal axis time, and intensity is based on shades, with high intensity being in white. The plot of FIG. 2 shows the rms (root mean square) energy profile for the speech. This is an extreme example of the problems found in energy-based location of speech. When parameters were tuned to best extract speech and reject noise, the energy-based algorithm only found the speech segment located from 1.4 to 1.6 seconds. The other energy elements were either too low in amplitude or too short in duration. Specifically, the large energy peak at about 1.0 seconds was discarded because it was too short, and thus looked too much like a click or pop on the telephone line.

The above problem could be minimized by examining the spectrogram in FIG. 1. From the spectrogram it is clear that speech exists at the times between 1.0 and 1.6 seconds. However, the energy information is not by itself conclusive enough, since it must take into account possible clicking, popping, breath sounds, and other interfering phenomena.

Figure 3:
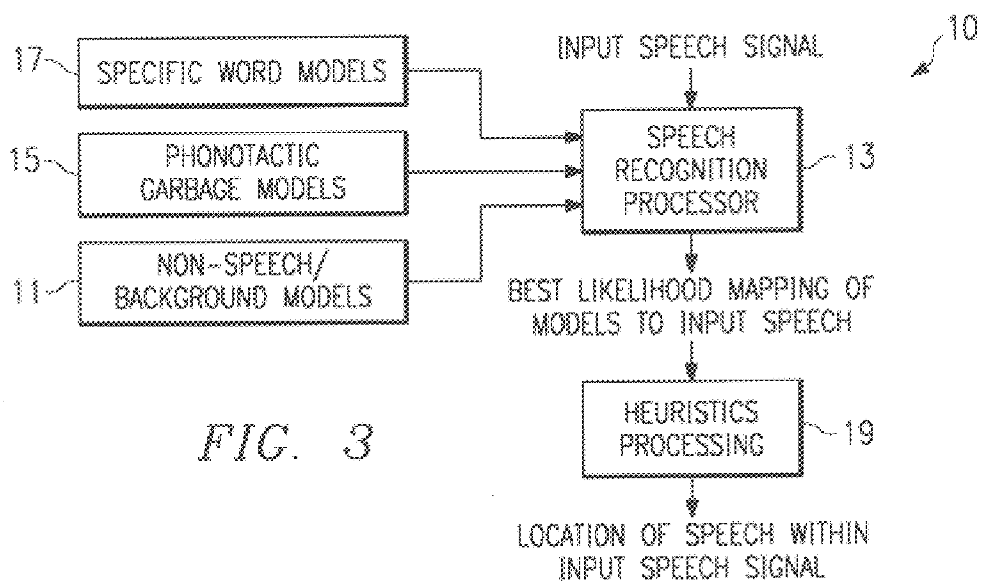
FIG. 3 illustrates a recognizer according to one embodiment of the present invention.

To solve the problem, the method of this invention includes a speech recognizer 10 in FIG. 3 designed to recognize general speech patterns such as those in English. The speech recognition processor 13 can be of general purpose and can use any one of the well known types of HMM-based recognizers. The models used in the recognizer 10 include specific word models 17 and models 11 for spurious inhalation, exhalation, noise sounds, and background silence. In addition, the recognizer according to the present invention includes a unique set of Hidden Markov Model (HMM) general speech sound models 15 used to model words and phrases within the context of a given language such as English. The incoming speech signal from a microphone, for example, would be compared at the Speech Recognition Processor 13 to the models 11, 15, and to detect the presence of speech or best likelihood mapping of models to input speech. These models are stored in a storage memory or medium such as a random access memory (RAM). The processing and any probability scoring may be provided by a computer. The output from the processor 13 is further processed through certain heuristics processing 19 to locate speech within the input signal. The operation of the processor 13 would follow the flow chart of FIG. 4. The processor 13 would load word, garbage, and non-speech models (Step 401). The processor would receive the input speech (Step 402) and determine the optimal mapping of the input speech to models (Step 403).

The "garbage models" is defined as a model for any speech which may be words or sounds for which no other model exists within the recognition system. There are several possibilities for means of constructing garbage models. A single garbage model commonly used in state-of-the-art recognition systems, shown in FIG. 5, models a collection of broad phonetic classes of speech sounds which are linked to form the sounds making up a word. As shown in FIG. 5, the circles represent the acoustic broad phonetic classes. The solid lines indicate transitions that may be made in either direction from one broad phonetic class to another. The dotted lines indicate that the model, may loop in a particular state. Transitions are weighted by probabilities based on temporal phonotactic constraints. These constraints require that the longer a given phonetic class is used to explain speech, the less likely the class will be used to explain subsequent speech, and the more likely subsequent speech will be explained by other different phonetic classes. The model may begin explaining speech by entering or leaving at any state.

Figure 7:
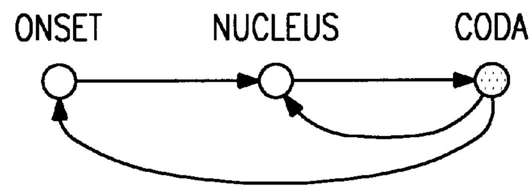
FIG. 7 illustrates grammar using garbage models to define words.

In contrast, the preferred embodiment of this invention uses hierarchical structured HMM garbage models 15 to enforce syllabic constraints on the speech. This set of garbage models uses the same broad acoustic phonetic classes as shown in FIG. 5, but the HMM topologies are modified to model the onset, nucleus, and coda portions of a syllable as shown in FIG. 6. The onset model shown in FIG. 6*a* enforces constraints that allow onset of a syllable with a sibilant, fricative, stop or nasal acoustic phonetic sound. The constraints further enforce that an initial sibilant may be followed by a fricative, stop, or nasal sound, a fricative may be followed by a stop or nasal, and that a stop or nasal occur at the end of the onset. The nucleus contains the vowel sounds of the front vowel, low vowel, back vowel or rhotacised vowel with transitions as illustrated in FIG. 6*b*. The final sound is the coda. The coda model shown in FIG. 6*c* enforces constraints that allow ending of a syllable with a sibilant, fricative, stop or nasal acoustic phonetic sound. The constraints further enforce that a nasal may be followed by a fricative or sibilant sound, and a fricative or sibilant may be followed by a stop. The shaded states indicate that the stop in the coda model may optionally be followed by an additional ending fricative or sibilant. The modeling of words and phrases of speech is defined by a higher level grammar that uses these garbage models as illustrated in FIG. 7. Note that the vowel sound is in the middle between the onset and coda and the nucleus includes the vowel sound.

It should be noted that a limitless number of variations of the broad phonetic class garbage model may be constructed. In particular, the model structures shown in FIG. 6 and FIG. 7 are appropriate for the phonotactics of English. The models can be modified for adaptation to the phonotactics of other languages, or sets of languages for applications involving other languages. The other languages may not have the onset, nucleus and coda format but would require a modeling format unique to that language. For, example, in Japanese, speech sounds can be broken into consonant-vowel pairs termed mora, and would require modeling of the periodic stress patterns associated with the speech. The generation of a language-specific garbage model would require the steps of analyzing the phonotactic structure of the language, constructing HMM models of the broad phonotactic constraints of the language, and training the HMM models using a corpus of speech data collected from the language.

Figure 8:
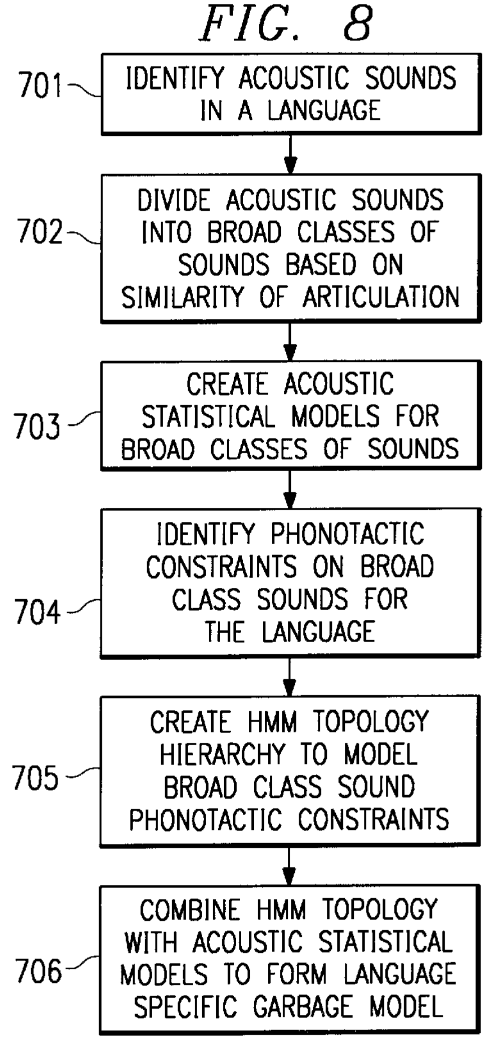
FIG. 8 is a flow chart ox the creation of a phonotactic garbage model.

Referring to the flow diagram of FIG. 8 there are provided the basic steps to create a phonotactic garbage model. The previous paragraphs discuss this process in the creation of the English garbage model. First we defined the classes of sounds in the language (Step 701) such as vowels, nasals, and stops. Then (Step 702) we defined how these sounds are produced in the mouth and grouped them into classes based on similar production of the sounds, such as types of vowels, nasals, and stops. We create the acoustical models for these classes (Step 703). We then determine the constraints (Step 704) the English language puts on these classes. For English this is a syllable-type structure which is shown in FIGS. 5 and 6. We create a HMM topology hierarchy to model the broad class sound phonotactic constraints (Step 705). Then we combine the HMM topology with acoustic statistical models to form language specific garbage model.

As another embodiment of this invention, a recognition grammar is carefully constructed which allows the recognizer to explain an input utterance as possible initial noise sounds or silence followed by one or more "words" as specified using the garbage modeling shown in FIG. 6 and FIG. 7 and ending with possibly more noise sounds or silence.

Using noise sound and silence models 11 and the unique garbage models 15, the recognizer 10 determines which state of which HMM model best matches each frame of input speech data. Those frames of speech data which are best matched by states of the unique garbage model 15 are designated as locations where speech exists.

After recognition, certain heuristics 19 (step 904) are applied to smooth the estimated locations of speech. See FIG. 3. For example, frames of the input mapped to garbage model states are separated by only a few frames mapped to non-garbage states, then the few frames are also assumed to be from speech. Further, if very short sections of speech are isolated, then those frames are ignored as valid speech.

Testing of the recognition-based algorithm yielded significantly better speech location performance. In the speech shown in FIG. 1, the recognition-based algorithm located speech from 0.86 to 1.64 seconds.

Figure 9:
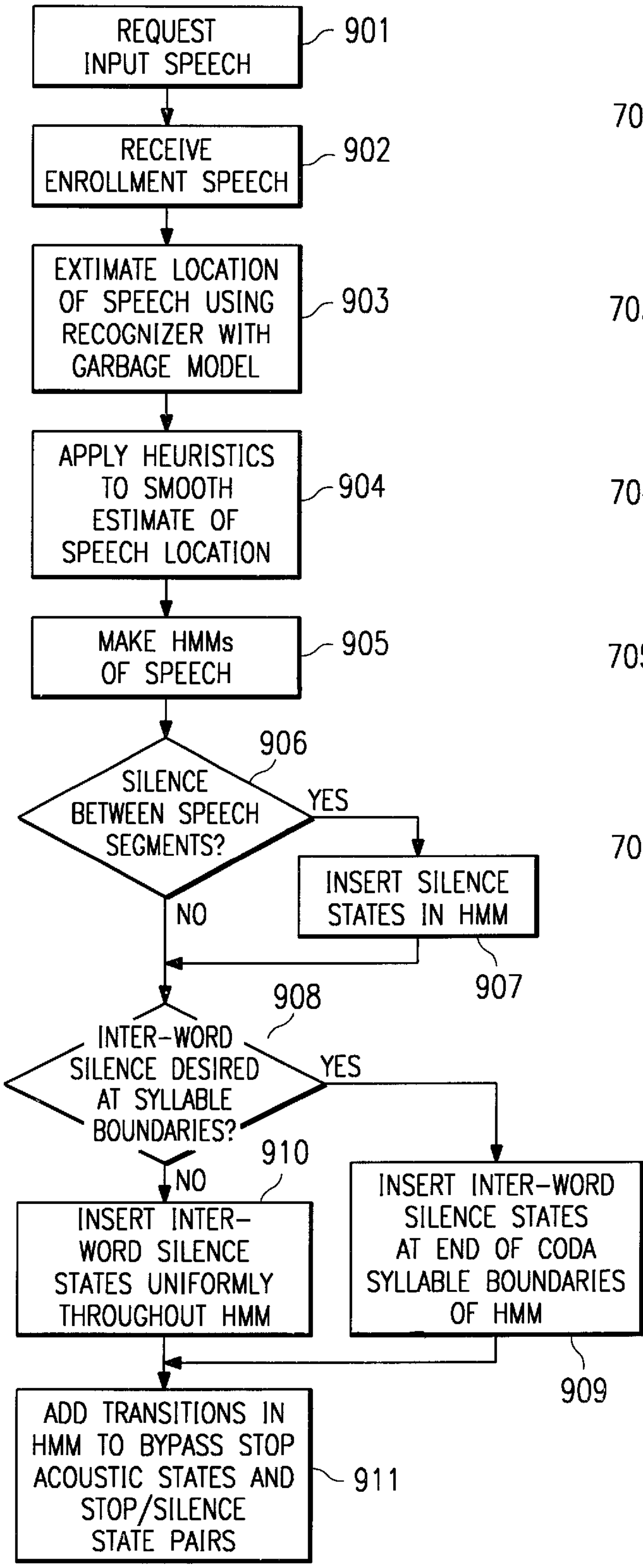
FIG. 9 illustrates the enrollment steps for creation of a speech recognition model.

As another embodiment of this invention, the unique garbage model and recognition-based algorithm is used to create a unique HMM of the speech from an utterance. The steps in model creation are shown in FIG. 9. The process begins with requesting input speech at step 901 and receiving the enrollment speech at Step 902. After receiving a speech utterance, the creation process uses the unique garbage model and recognition-based algorithm of FIG. 10, as already described, to locate the speech within the utterance (Step 903). The heuristics to smooth estimate of speech location are applied (Step 904). After speech is located, this invention constructs a single HMM (Step 905) which encompasses all of the located speech.

Figure 10A:
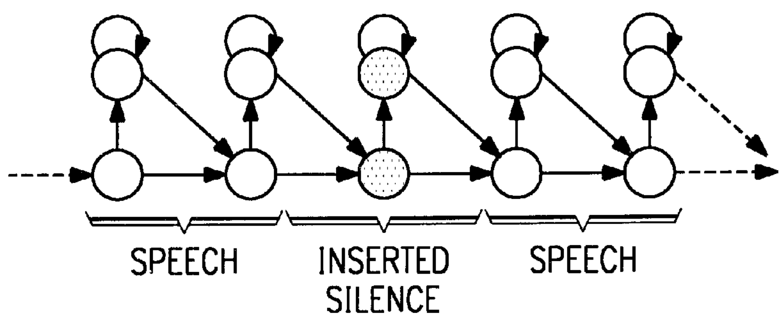
FIG. 10*a* and 10*b* illustrate HMM topology modification.

As in present art systems, if a pause is detected, then according to the program operating under the HMM construction algorithm inserts silence states (Step 907) in the model to model the pause as shown in FIG. 9. The HMM construction algorithm models all other states as speech states. This process is illustrated in FIG. 10*a*.

However, if the user says a name with no pause, then present art models contain no added silence states. If subsequently the user says the name with a pause, then the model structure does not match the speech, reducing recognition performance.

Figure 10B:
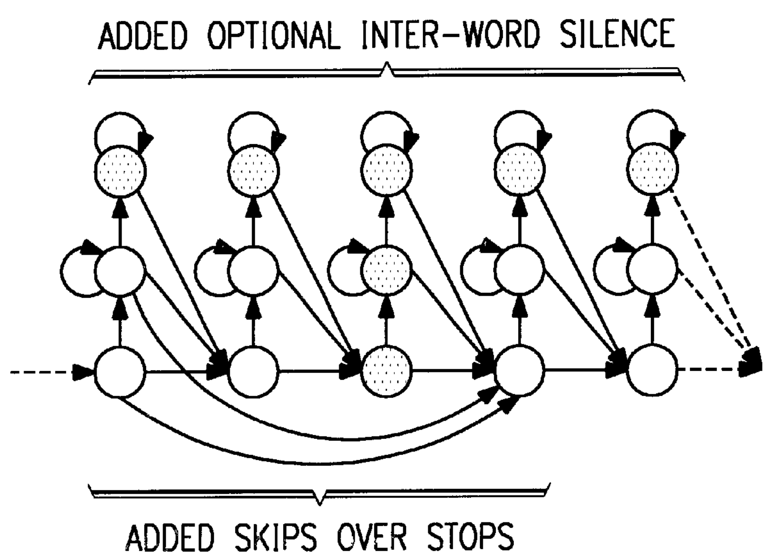

In order to correct this problem, applicants teach herein added optional inter-word silence states (Steps 908, 909, and 910 in FIG. 9) to the model as illustrated in the FIG. 10*b*. This models an optional inserted pause at any point in the speech. In FIG. 10*b* each vertical set of states represents a unique observed acoustic event, with an optional interword silence state (represented by the gray shaded state) possible following the acoustic event. To ensure that the inter-word silence states are used only for significant pauses, probability weights of the inter-word silence states are set to discourage their use for short silence segments (<60 ms) within words. While this is the preferred embodiment of the invention, other structures are possible which include the inter-word silence. For example, using the recognition results of speech locating using the unique invented garbage models and recognition-based speech locating process previously described, it is possible to insert silence states only at points identified as syllable boundaries (Step 908).

Another part of the invention involves modification of the HMM to correctly model data when the stop portion of a syllable is located at the end of word or phrase segment as determined during speech locating using the unique garbage model. In this case, the invention adds transitions (Step 911) to optionally bypass the pause and stop portions of the model, as shown in FIG. 9 and FIG. 10*b*. This illustrated at the bottom of FIG. 10*b*, where the transitions, represented by lines with directional arrows, allow the model to bypass states corresponding to stop portions of syllables and also pauses between words. The flow chart of FIG. 9 may be a program in the recognizer processor of FIG. 3.

These two modifications reflect a more realistic model of speaker variation, and hence improve recognition performance.

As another embodiment of the invention, the unique garbage models may be included in a speech recognition or verification system along with models for specific words and other non-speech sounds. The unique garbage model can be used to successfully model extraneous speech within an utterance for which no other model exists. In this way, the recognition system can locate speech containing specific words in the midst of other speech.

The Speech Research Branch at Texas Instruments Incorporated collected a speech database intended for evaluation. This database was collected over telephone lines, using three different handsets. One handset had a carbon button transducer, one an electret transducer, and the third was a cordless phone.

Ten speakers, five female and five male provided one enrollment session and three test sessions using each handset During the enrollment session each speaker said three repetitions of each of 25 names. The names spoken were of the form of "first-name last-name". Twenty of the names were unique to each speaker, and all speakers shared five names. During the test sessions, each speaker said the 25 names three times, but in a randomized order. For the test sessions the names were preceded by the word "call". Prior to recognition, all test utterances were screened to ensure their validity.

To test the invention, enrollment models were created for each different speaker, handset type and name using the recognition-based method for locating speech and adopting the new model HMM topology structures presented above in connection with FIG. 10*b*.

Recognition was performed using enrollment models from each handset type and test utterances from all three handset types. Table 1 shows the utterance error results using the invented methods of utterance location and HMM modeling.

TABLE 1

Utterance Error in %, New Method

| | cu cr | cu er | cu cir | eu cr | eu er | eu cir | clu cr | clu er | clu cir | all |
|---|---|---|---|---|---|---|---|---|---|---|
| S01 | 0.0 | 0.0 | 0.4 | 0.0 | 0.0 | 1.3 | 0.0 | 0.4 | 0.0 | 0.2 |
| S02 | 0.3 | 0.9 | 1.3 | 0.0 | 0.0 | 5.3 | 3.0 | 1.8 | 0.0 | 1.3 |
| S03 | 0.0 | 0.0 | 1.4 | 0.0 | 0.0 | 0.7 | 0.9 | 0.0 | 0.0 | 0.3 |
| S04 | 0.0 | 0.3 | 0.0 | 0.0 | 0.3 | 0.0 | 8.0 | 8.1 | 7.3 | 2.7 |
| S05 | 0.3 | 0.4 | 4.1 | 2.7 | 0.0 | 5.4 | 2.7 | 0.0 | 0.7 | 1.6 |
| S06 | 0.0 | 0.0 | 0.7 | 0.0 | 0.0 | 0.7 | 0.4 | 0.0 | 0.7 | 0.2 |
| S07 | 0.0 | 0.3 | 1.3 | 2.2 | 0.0 | 1.3 | 0.0 | 0.0 | 0.4 | 0.6 |
| S08 | 0.0 | 0.0 | 0.9 | 0.4 | 0.0 | 3.1 | 0.4 | 0.0 | 0.0 | 0.5 |
| S09 | 1.7 | 0.5 | 8.7 | 5.3 | 2.3 | 15.4 | 9.7 | 8.1 | 4.7 | 5.8 |
| S10 | 0.0 | 0.4 | 2.3 | 0.4 | 0.9 | 2.3 | 4.0 | 0.9 | 1.1 | 1.3 |
| all | 0.3 | 0.3 | 2.0 | 1.2 | 0.3 | 3.3 | 3.3 | 1.9 | 1.3 | 1.5 |

Table 1 shows the results for each speaker (S01–S10). The type of update and recognition is given at the top of the table where cu, eu, and clu stand for enrollment using carbon, electret, and cordless handsets respectively. The test utterances are indicated by cr, er, and cir indicating carbon, electret, and cordless test data respectively.

The results using the new method should be compared with those of Table 2, which shows the results for baseline recognition without the invention. Especially of interest are comparisons of the results for speakers S09 and S10. these two speakers were known to have significant variations in pronunciations during enrollment and testing.

TABLE 2

| | Utterance Error in %. Baseline Method | | | | | | | | | |
|---|---|---|---|---|---|---|---|---|---|---|
| | cu cr | cu er | cu cir | eu cr | eu er | eu cir | clu cr | cfu er | clu cir | all |
| S01 | 0.9 | 0.4 | 0.0 | 0.4 | 0.4 | 1.8 | 5.4 | 5.8 | 1.3 | 1.8 |
| S02 | 0.7 | 0.0 | 2.0 | 1.0 | 1.8 | 4.7 | 13.7 | 9.0 | 10.7 | 4.8 |
| S03 | 0.4 | 0.3 | 2.8 | 1.8 | 2.4 | 0.7 | 3.6 | 7.5 | 0.0 | 2.4 |
| S04 | 0.3 | 0.7 | 0.0 | 0.0 | 0.3 | 0.0 | 3.3 | 3.7 | 3.3 | 1.3 |
| S05 | 0.7 | 3.6 | 2.7 | 1.0 | 0.9 | 11.6 | 2.3 | 0.9 | 2.7 | 2.3 |
| S06 | 0.0 | 0.0 | 0.7 | 4.0 | 1.3 | 2.0 | 0.0 | 0.0 | 0.7 | 0.9 |
| S07 | 0.4 | 0.7 | 2.2 | 2.2 | 0.0 | 1.8 | 1.3 | 0.0 | 1.8 | 1.1 |
| S08 | 0.0 | 0.0 | 0.4 | 0.4 | 0.0 | 2.7 | 2.7 | 0.0 | 0.0 | 0.7 |
| S09 | 10.7 | 14.9 | 23.5 | 19.3 | 8.6 | 30.2 | 16.2 | 23.7 | 17.4 | 17.6 |
| S10 | 2.0 | 4.9 | 9.6 | 1.8 | 0.8 | 4.0 | 7.6 | 8.0 | 20.9 | 6.3 |
| all | 1.8 | 2.3 | 4.0 | 3.5 | 1.6 | 5.4 | 6.9 | 4.8 | 5.3 | 3.8 |

Increased performance in the speech recognition tasks results from application of new speech location algorithms and HMM model modifications. The new approaches reduce overall average error from 3.8% to 1.50%. These invented methods may be used to increase field performance for any application in which the speech recognizer system must build models for unique words or phrases provided by a user, where the words or phrases are not known until spoken. This includes speaker dependent recognition applications such as spoken speed dialing, speaker verification for security, and speaker identification as in a "voice logon" system in which users say their names to gain access to an application.

The enrollment and modeling may be used in telephones, cellular phones, Personal Computers, security, and many other applications.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A speech model for speech recognition systems comprising:

a storage medium, an HMM garbage model restricted to meet the phonotactic constraints of at least one language, and said model stored on said storage medium.

2. The model of claim 1 wherein said phonotactic constraints will model unique phonotactic sub-word structure of a language in onset, nucleus, and coda portions of a syllable.

3. The model of claim 2 wherein said nucleus contains a vowel sound.

4. The model of claim 3 wherein said constraint is English language.

5. A method of forming a speech recognition model comprising the steps of:

providing an HMM garbage model and restricting said HMM garbage model to fit the phonotactic constraints of a language or group of languages.

6. The method of claim 5 wherein said restricting step includes restricting unique phonotactic sub-word structure of a language in onset, nucleus, and coda portions of a syllable.

7. The method of claim 6 wherein said nucleus contains a vowel sound.

8. The method of claim 7 wherein said constraint is English.

9. A speech recognition system comprising:

a set of models for certain words to be recognized;

a garbage model restricted to fit the phonotactic constraints of a language; and means coupled to said set of models for certain words and said garbage model and responsive to received speech for recognizing said certain words in the midst of other speech.

10. The recognition system of claim 9 wherein said garbage model constraint will model sub-word structure of a language in onset, nucleus, and coda portions of syllables.

11. The recognition system of claim 10 wherein said nucleus includes a vowel sound.

12. The recognition system of claim 11 wherein said constraint is English.

13. A speech recognition system comprising:

a first set of models for certain words to be recognized;

a garbage model restricted to fit the phonotactic constraints of a language or languages;

a second set of models for silence, pops, and other non-speech sounds;

means coupled to said first and second set of models and said garbage model for recognizing said certain words in the midst of non-speech sounds and other speech.

14. The recognition system of claim 13 wherein said garbage model constraint includes constraint in sub-word structure in onset, nucleus, and coda portions of a syllable.

15. The recognition system of claim 14 wherein said nucleus includes a vowel.

16. The recognition of claim 15 wherein said constraint is English.

17. A speech enrollment method comprising the steps of:

querying an enrollee to speak an enrollment word or phrase for modeling;

receiving an utterance of an enrollment word or phrase;

recognizing the received utterance with a recognition system which includes using a garbage model restricted to fit a phonotactic constraint of a language to determine speech portion, and constructing an HMM to model the portion of the received utterance determined to be speech by the recognition system and phonotactic garbage model.

18. The method of claim 17 wherein said constraint will model sub-word structure of a language in onset,nucleus, and coda portions of syllables.

19. The method of claim 18 wherein said constraint includes said nucleus with a vowel.

20. The method of claim 19 wherein said constraint is English language.

21. The method of claim 17 wherein said constructing step includes constructing an HMM model structure with multiple acoustic states and an interword silence state at acoustic states of said model.

22. The method of claim 21 wherein said interword silence state is inserted between each acoustic state.

23. The method of claim 21 wherein said interword silence state is located between selected syllables.

24. The method of claim 21 wherein said interword silence state is weighted to discourage use for a short silence segment.

25. The method of claim 21 further including the step of skipping over stops such that transitions optionally bypass the stop and pause portions of the model.

* * * * *

UNITED STATES PATENT AND TRADEMARK OFFICE
CERTIFICATE OF CORRECTION

PATENT NO. : 6,470,315 B1
DATED : October 22, 2002
INVENTOR(S) : Lorin P. Netsch et al.

It is certified that error appears in the above-identified patent and that said Letters Patent is hereby corrected as shown below:

Title page,
Insert Item [60] as follows: Related U.S. Application Data -- [60] Provisional Application No. 60/003,576 September 12, 1995. --

Signed and Sealed this

Eighteenth Day of February, 2003

JAMES E. ROGAN
*Director of the United States Patent and Trademark Office*